United States Patent
Föhl

[11] Patent Number: 5,411,291
[45] Date of Patent: May 2, 1995

[54] DRIVE UNIT FOR A BELT PRETENSIONER IN VEHICLE SAFETY BELT SYSTEMS

[75] Inventor: Artur Föhl, Schorndorf, Germany

[73] Assignee: TRW Repa GmbH, Alfdorf, Germany

[21] Appl. No.: 206,599

[22] Filed: Mar. 3, 1994

[30] Foreign Application Priority Data

Mar. 6, 1993 [DE] Germany ............. 43 07 062.0

[51] Int. Cl.[6] ............ B60R 22/46,21/26; F42G 19/10
[52] U.S. Cl. ......................... 280/806; 188/375
[58] Field of Search ............... 280/805, 806; 188/371, 188/375

[56] References Cited
U.S. PATENT DOCUMENTS

| | | | |
|---|---|---|---|
| 3,354,990 | 11/1967 | Stahl | 188/375 |
| 4,441,738 | 4/1984 | Tsuge et al. | 280/806 |
| 4,573,322 | 3/1986 | Föhl | 280/806 |
| 5,261,697 | 11/1993 | Fohl | 280/806 |
| 5,284,307 | 2/1994 | Kotama | 242/107 |
| 5,350,194 | 9/1994 | Föhl | 280/806 |

FOREIGN PATENT DOCUMENTS 1458873 11/1966 France .
8617847.4 6/1989 Germany .

*Primary Examiner*—Kenneth R. Rice
*Attorney, Agent, or Firm*—Tarolli, Sundheim & Covell

[57] ABSTRACT

The invention relates to a belt pretensioner for vehicle safety belt systems comprising a pyrotechnic gas generator (12) and a piston and cylinder unit (16, 20) mounted in a housing block (14). The piston (20) of the piston and cylinder unit (16, 20) is arranged on a first end (161) of the cylinder (16) as well as being connected with a cable (22) and it is accelerated towards the second end (162), which has a constriction, of the cylinder (16) by the gas pressure produced by the gas generator (12). The piston and cylinder unit (16, 20) with the housing block (14) and the gas generator (12) mounted therein constitute a pivotally bearinged vehicle-sensitive inertial mass. In accordance with the invention a deformable member (46) is arranged on the piston (20) and on acceleration of the piston (20) is entrained towards the second end (162) of the cylinder (16) by the piston (20) and on impingement on the wall parts of the cylinder (16) constituting the constriction is plastically deformed.

6 Claims, 2 Drawing Sheets

DRIVE UNIT FOR A BELT PRETENSIONER IN VEHICLE SAFETY BELT SYSTEMS

The present invention relates to a drive unit for a belt pre-tensioner in vehicle safety belt systems.

In a belt pretensioner disclosed in U.S. Pat. No. 5,261,697, a drive unit is provided with a cylinder connected to a housing block, a piston received in the cylinder and a pyrotechnic gas generator accomodated in the housing block. A cable is connected to the piston to transmit piston movement caused by activation of the gas generator to an engagement member of the belt system. Activation of the gas generator is caused by a vehicle-sensitive trigger mechanism. The end of the cylinder is tapered and is used as a catch device. For instance in the case of an unused safety belt system or of a broken cable the piston, which is accelerated owing to the gas pressure produced by the gas generator, is retarded in order to prevent it being expelled from the cylinder. The cylinder and the piston are as a rule manufactured of aluminum. The piston and cylinder with the gas generator and the housing block form a movable assembly which is employed as a vehicle-sensitive inertial mass of the trigger mechanism. Owing to the absence of a separate inertial mass it is possible for the space requirement and the quantity of material and assembly work to be cut down to a minimum.

In order to increase the protective action of safety belt systems high power pyrotechnic linear drives have been introduced for pretensioning the belt. Owing to the high power linear drives the forces acting on the cylinder during retardation or deceleration of the piston are increased. More particularly on operation of the gas generator and of an unused safety belt the piston energy would now be sufficient to splay out the conically tapering terminal part of the cylinder, functioning as a piston catch device, so that the piston may be expelled from the cylinder.

One object of the invention is to provide an improved drive unit for a belt pretensioner wherein reliable deceleration of the piston is ensured even with an enhanced gas generator power without however impairing the vehicle-sensitive function of the assembly formed by the housing block with the cylinder, piston and gas generator accomodated therein.

This object is attained in accordance with the invention by providing the piston with a dampening member of a plastically deformable material which on acceleration of the piston is driven by the piston towards the tapered end of the cylinder and on impingement against the wall parts defining the tapered end is plastically deformed.

The invention is based on the notion that the distance between the center of gravity of the piston and cylinder linear drive and the pivot axis is an important parameter for the sensitivity of response for causing ignition of the gas generator. In the case of the design of the belt pretensioner in accordance with the invention particular attention has hence been paid to the resulting center of gravity in the case of the piston and cylinder linear drive. Owing to the arrangement of a deformable dampening member on the piston it is possible to obtain a simple adjustable retarding action, in accordance with requirements, in the terminal part of the cylinder. The arrangement of the deformable dampening member is not responsible for any disadvantageous effect on the center of gravity, since the mass of the member is adjacent to the original center of gravity of the piston and cylinder linear drive. Therefore it is possible for all the piston and cylinder linear drive designs of the type initially mentioned to be furnished with a deformable member without sensitivity of response of the piston and cylinder linear drive being substantially impaired. It is even possible to adjust the response sensitivity to a certain extent by modification of the mass and the design of the deformable member.

The retarding action may be optimized by the selection of the geometry of the deformable dampening member and of the piston. In accordance with one advantageous working embodiment the piston has an axial neck with a reduced cross sectional area at the end facing the second end of the cylinder and the deformable member, which has a sleeve-like configuration, is slipped onto the neck of the piston. It is furthermore an advantage if a deformation space is constituted in the deformable member so that a preferentially directed deformation of the deformable member may take place on retarding the piston. For this purpose the outer and/or inner enveloping surface has a shaped, that is to say non-circular, outline more particularly in the form of ridges and/or grooves extending in the axial direction.

The retarding effect on the piston may furthermore be optimized by a suitable selection of the material. The fusion temperature of the material of the deformable member should be above the self-ignition temperature of the material of the pyrotechnic gas generator. This may for instance be achieved by employing a metallic solder-like material such as a tin alloy. The retarding action on the piston owing to the deformable member then remains effective even if the vehicle catches fire and the gas generator is ignited by the action of heat.

Further developments and advantages of the invention will be understood from the following detailed descriptive disclosure in conjunction with the drawings.

FIG. 3b is a cross section of the deformable member in accordance with FIG. 3a.

FIG. 4a and

Figure 5A:
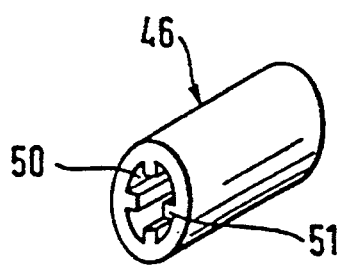

FIG. 5a respectively show one perspective view of a further working embodiment of a deformable member in accordance with the invention.

FIG. 4b and

Figure 4A:
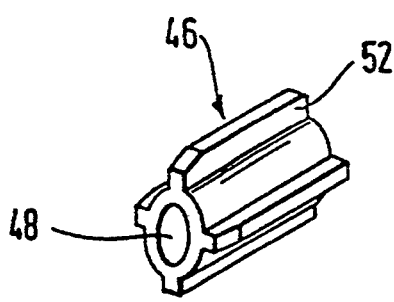
Figure 5B:
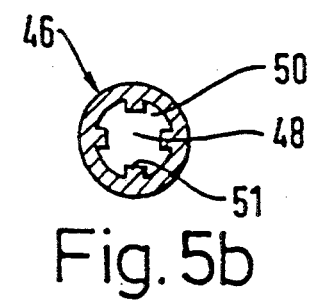

FIG. 5b each show one cross sectional view of the deformable member in accordance with FIG. 4a and, respectively, FIG. 5a.

Figure 1:
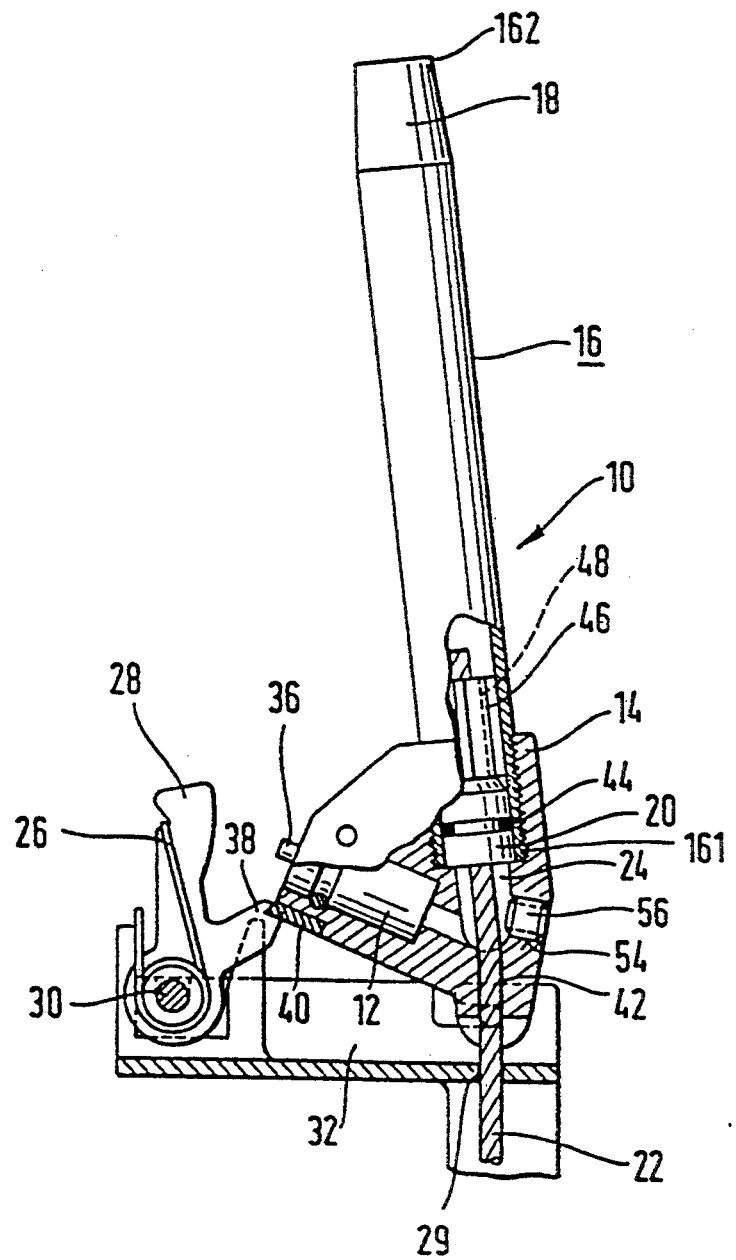
FIG. 1 is a cross section of part of a pyrotechnic piston and cylinder linear drive in accordance with the invention.

In FIG. 1 the reader will see a cross section of part of a piston and cylinder linear drive 10 of a belt pretensioner for vehicle safety belt systems. The piston and cylinder linear drive 10 consists of a gas generator 12, a housing block 14, in which in a suitable recess the gas generator 12 is arranged, a cylinder 16 with a tapering terminal part 18 and a piston 20 able to slide in the cylinder 16 and which is connected with a cable 22.

A first end of the cylinder 16 is provided with a screw thread and is screwed into a corresponding screw threaded recess in the housing block 14. In the inactive, neutral position the piston 20 is at the first end 161 of the cylinder 16. Adjoining the piston 20 there is a pressure chamber 24, which is connected with the receiving space of the mechanically fired gas generator 12. It is naturally possible to provide other firing or igniting device, such as for instance an electrical firing device. For the mechanical firing of the gas generator 12 there is however a impact lever cocked against a spring or two-legged torsion spring by abutting against the housing block 14. The firing or impact lever 28 is journaled by means of a pin 30 in pivotal manner on the supporting housing 32. The housing block 14 is also pivotally mounted by means of a bearing pin (not illustrated). The gas generator 12 has its end projecting from the housing block 14 connected with a firing device with a firing pin 36. The outer end of the firing pin 36 extends out of the bottom surface of the gas generator 12.

The firing lever 28 is urged by the spring 26 in a direction corresponding to a movement of the firing lever 28 towards the firing pin 36. As shown in FIG. 1 the firing lever 28 is in its neutral position. A neck 38 molded on the firing lever 28 and projecting towards the housing block 14 and having a stepped surface contacts a retaining surface 40 of the adjacent end of the housing block 14. The spring 26 therefore loads not only the firing lever 28 but furthermore the housing block 14 so that it is kept in a stable neutral position.

The cable is trained through the pressure chamber 24 and a hole 29 substantially matching the cross section of the cable 22. The cable 22 may in a known manner be furnished with a belt drum (not illustrated) or with a belt buckle which is not illustrated either.

Figure 2:
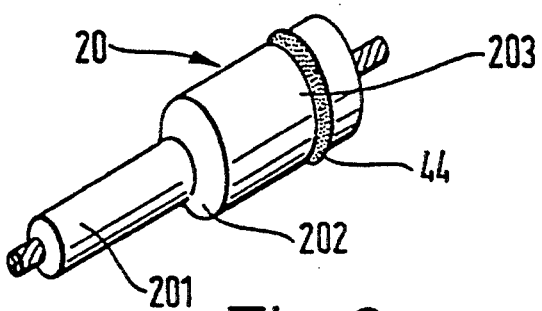
FIG. 2 is a perspective view of a piston as in FIG. 1.

The piston 20 is crimped onto the cable 22 and has a seal 44 in a circumferential groove (see FIGS. 1 and 2) so that the gas pressure produced by the gas generator 12 may act in a more or less loss-free manner on the piston 20. At its front end the piston 20 has a sleeve-like neck 201 (see FIG. 1), which is connected with the rest 203 of the piston by means of a conical part 202. The cylinder 16 and the piston 20 each have a circular cross section right along their lengths.

Over the neck 201 a deformable dampening member 46 is slipped, which has a cylindrical recess 48 axially extending through it and adapted to the neck 201 of the piston 20. The sleeve-like deformable member 46 is to be seen in detail in FIGS. 3a and 3b. In the inner enveloping of the deformable member 46 grooves 50 are machined, between which axially extending ridges 51 are left. The outer enveloping surface of the deformable member 46 is furnished with ridges 52, which like the ridges 51 extend in parallelism to the center axis of the cylinder 16. Short of the second free end 162 of the cylinder 16 the cylinder 16 is frustoconical in its geometry with the result that the cross sectional area of the hole in the cylinder 16 tapers in this terminal part 18 towards the second end 162.

The piston and cylinder linear drive 10 is installed in the vehicle with such a relative orientation that the housing block 14 will, when subject to the inertial forces occurring during deceleration of the vehicle, tend to be pivoted out of the neutral illustrated in FIG. 1 towards an operational or tripped position. As soon as the terminal edge of the housing block 14 has moved past the neck 38, the firing lever 28 is released. It is now accelerated by the compression spring 28 so that the firing lever 28 is driven against the free end of the firing pin 36. Owing to the firing of the gas generator 12 gases a released which flow through the pressure chamber 24 in the housing block 14 into the lower end of the cylinder 12 and drive the piston 20 in the cylinder 16 with the deformable member 46, the cable being entrained as well.

Once the piston 20 has reached the terminal part 18 of the cylinder 16, the front part of the deformable dampening member 46 will be driven against the conically tapering inner bore of the cylinder 16 by the piston and the deformable member 46 will plastically be deformed against resistance of the cylinder wall. The deformation follows a definite direction, since the material is able to flow into the grooves 50 and, respectively, into the free spaces between the ridges 51 and 52. The deformable member 46 is then so plastically deformed that it assumes the opposite contour of the piston 20 and of the end part 18 in the cylinder 16.

The deformable member 46 consists of a metallic solder-like material such as for instance a tin alloy. The fusion point of the material is above the self-ignition temperature of the gas generator 12 so that the retarding action of the deformable member 46 on the piston 20 is still ensured even in the case of the action of heat leading to ignition of the gas generator, as for instance in case of fire.

In a hole 54 in the housing block 15 there is a plug 56 of a material whose fusion temperature is above that of the operational temperature range of the gas generator 12 and at the most is equal to the self-igniting temperature of the gas generator 12. The plug 56 softens under the action of heat, for instance in case of a fire and on firing of the gas generator 12 frees the hole 54 so that no dangerously high gas pressures may occur in the pressure chamber 24.

Figure 3A:
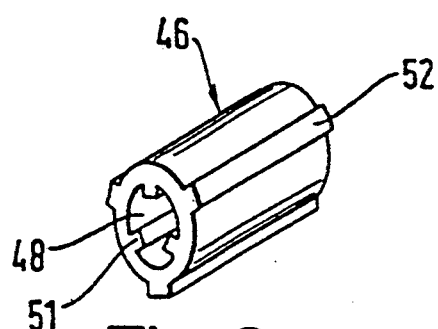
FIG. 3a is a perspective view of the deformable member of FIG. 1.
Figure 3B:
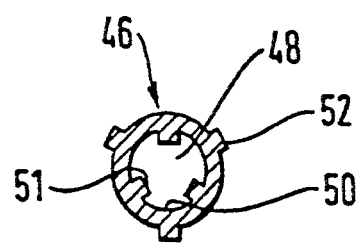
Figure 4B:
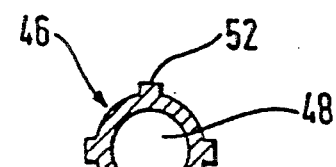

Further working embodiments of the deformable member 46 are to be seen in FIGS. 4b and 5b. The deformable member 46 in accordance with FIGS. 4a and 4b is generally the same as the deformable member 46 of FIGS. 1, 3a and 3b. It differs from them however because the inner enveloping surface is free of ridges. Furthermore there are more ridges on the outer enveloping surface of the deformable member 46. The ridges 52 are made oblique in their front part. This is an advantage as regards impact of the deformable member 46 on the frustoconical terminal part 18 of the cylinder 16.

The working embodiment in accordance with FIGS. 5a and 5b differs from the first working embodiment in accordance with FIGS. 1, 3a and 3b since the deformable member 46 is devoid of ridges on the outer enveloping surface and an additional ridge 51 is produced of the inner surface of the deformable member 46.

The number of the grooves 50 or, respectively, ridges 51 and 52 and furthermore the size of the deformable member 46 may be modified in accordance with the power of the gas generator 12 and in accordance with the desired distance of the center of gravity from the pivot axis. By such shaping it is possible for the plastic deformation of the deformable member 46 to be affected and therefore for the retarding effect on entry of the piston 20 into the frustoconical terminal part 18 of the cylinder 16 may be adjusted so that a reliable retarding effect on the piston 20 is ensured in every possible situation.

As is clear from the working embodiments described it is possible for the retarding action of the deformable member 46 to be optimally set by the selection of the shape and the material.

What is claimed is:

1. A drive unit for a safety belt pretensioner, comprising a base adapted to be secured on a vehicle bodywork, a vehicle-sensitive trigger mechanism comprising an inertial mass, a housing pivotally mounted in said base, a cylinder having a first end fixed in said housing block and a second, tapered end, a piston slidingly received in the first end of said cylinder, a cable connected to said piston and a pyrotechnic gas generator accomodated in said housing block, said piston carrying a dampening member of a material which is plastically deformed upon impact of said dampening member on cylinder wall portions defining said tapered cylinder end, and said housing block with said cylinder, gas generator, piston and dampening member being part of said inertial mass.

2. The drive unit of claim 1, wherein said dampening member is of a material which has a fusion temperature above a self-ignition temperature of said gas generator.

3. The drive unit of claim 2, wherein said dampening member is of a metallic alloy.

4. The drive unit of claim 1, wherein said piston has a neck portion with reduced cross section on its side facing said tapered cylinder end, said dampening member being tubular and seated on said neck portion.

5. The drive unit of claim 1, wherein said dampening member has an outer surface provided with ridges and grooves alternating in a peripheral direction.

6. The drive unit of claim 4, wherein said dampening member has an inner surface provided with ridges and grooves alternating in a peripheral direction, said ridges engaging said neck portion of said cylinder.

* * * * *